United States Patent [19]

Bullat

[11] 4,085,345
[45] Apr. 18, 1978

[54] TORQUE-LIMITING STOP DEVICE

[75] Inventor: Jean Bullat, Bonneville, France

[73] Assignee: Etablissements CARPANO & PONS, France

[21] Appl. No.: 740,715

[22] Filed: Nov. 10, 1976

[30] Foreign Application Priority Data

Nov. 19, 1975 France .................................. 75 36255

[51] Int. Cl.² ............................................. H02K 7/12
[52] U.S. Cl. ................................... 310/117; 310/68 B; 318/475
[58] Field of Search ........................ 318/467, 491, 475; 310/68 B, 117, 68, 89

[56] References Cited

U.S. PATENT DOCUMENTS

| 2,387,533 | 10/1945 | Schmucker | 310/68 B X |
| 3,029,374 | 4/1962 | Pichon | 310/117 X |
| 3,958,140 | 5/1976 | Horgan | 310/89 |

Primary Examiner—Donovan F. Duggan
Attorney, Agent, or Firm—Robert E. Burns; Emmanuel J. Lobato; Bruce L. Adams

[57] ABSTRACT

A reversible electric motor has a torque limiting stop device actuable to stop the motor by angular displacement of the motor casing when an opposing torque on the motor shaft exceeds a threshold value. Complementary profiles are arranged to hold the motor casing in its displaced position so that the motor can only be restarted in the opposite direction to before.

5 Claims, 8 Drawing Figures

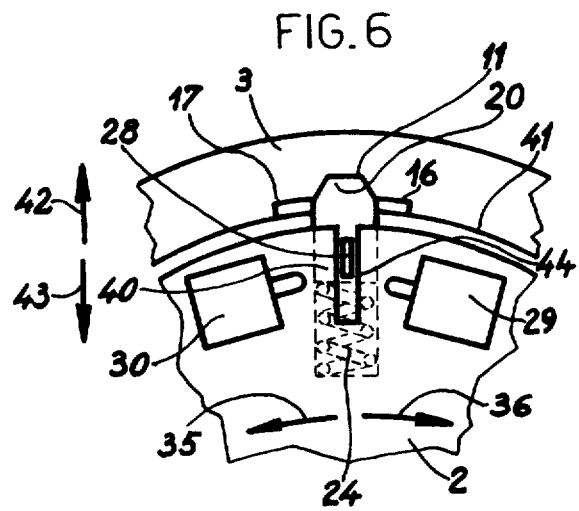
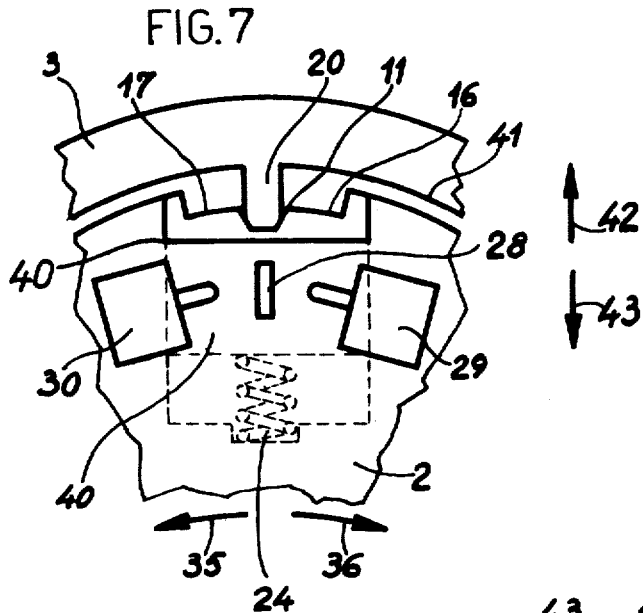
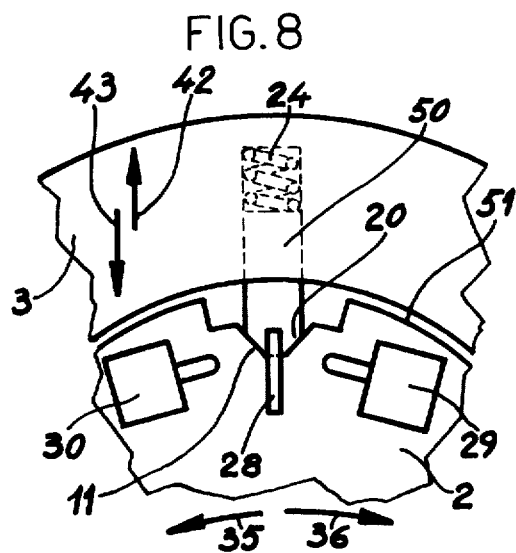

TORQUE-LIMITING STOP DEVICE

The invention concerns torque-limiting stop device of motors having a casing which tends to be fixed angularly in relation to a fixed support under the action of at least one elastic biasing means, in which means for controlling stopping of the motor is actuable by a given rotation of the motor casing when an opposing torque on the motor shaft exceeds a predetermined value.

In known devices of this type, such as that described in French Patent Specification No 1,431,931, the motor remains stopped as long as the opposing torque exerted on the motor shaft exceeds the threshold value. As soon as the torque drops below the threshold, the motor starts again in the same direction as before until the opposing torque once more exceeds the threshold, and so on. In some applications this can be a drawback since the motor, instead of remaining stopped, is successively stopped and started. Also, the torque limiting device is arranged to operate only for a single direction of rotation of the motor and does not operate in the opposite direction.

The invention accordingly proposes a torque-limiting stop device of the aforesaid type having two cooperating profiles, one in relief the other hollow, one fixed for rotation with the motor casing of the motor and the other fixed angularly with the fixed support. One of these cooperating profiles is provided on a mobile element movable by coaction of the profiles against the action of the elastic means in a direction secant to the direction of relative movement of the two profiles produced by rotation of the motor casing. At least one of the cooperating profiles has at least one ramp, each of the hollow profiles parts being extended by at least one bearing surface at least approximately perpendicular to the direction of movement of said mobile element. Each bearing surface may be terminated by an abutment.

With such a stop device it is possible to interrupt rotation of the motor as soon as an opposing torque exceeding a predetermined value is exerted on the motor shaft, whatever be the direction of rotation of the motor and ensure that the motor cannot start in the same direction as before, even if the opposing torque drops below the predetermined value.

According to an embodiment, the mobile element including one of the profiles is slidably mounted in the motor casing or in the fixed support, at least approximately radially to these two elements, the other profile being provided in a peripheral part of the fixed support or of the motor casing respectively. It may be noted that the fixed support may be disposed about the motor casing, or vice-versa.

In another embodiment, the mobile element is solid for rotation with the motor casing and is slidably mounted axially thereof, the profiled part of said mobile element being disposed at an end of the mobile element facing the cooperating profiled part on the fixed support.

In all of these embodiments, each hollow profile is preferably extended by bearing surfaces disposed on opposite sides of the hollow profile; each corresponding profile in relief comes to bear on one or the other of these bearing surfaces depending on the direction of rotation of the motor prior to interruption. Means for controlling stopping of the motor are arranged to act for each direction of rotation of the motor.

The means for controlling stopping of the motor may be formed for example by switches, proximity detectors, or photosensitive cell devices. Likewise, these control means may be actuated directly by the angular movement of the motor casing relative to the fixed support, or may also be actuated for example in response to displacement of the mobile element produced by coaction of the corresponding profiles.

The accompanying drawings show, by way of example, several embodiments of the device according to the invention. In the drawings:

FIGS. 6, 7 and 8 are partial views, similar to FIG. 3, showing second, third and fourth embodiments of the invention.

Figure 1:
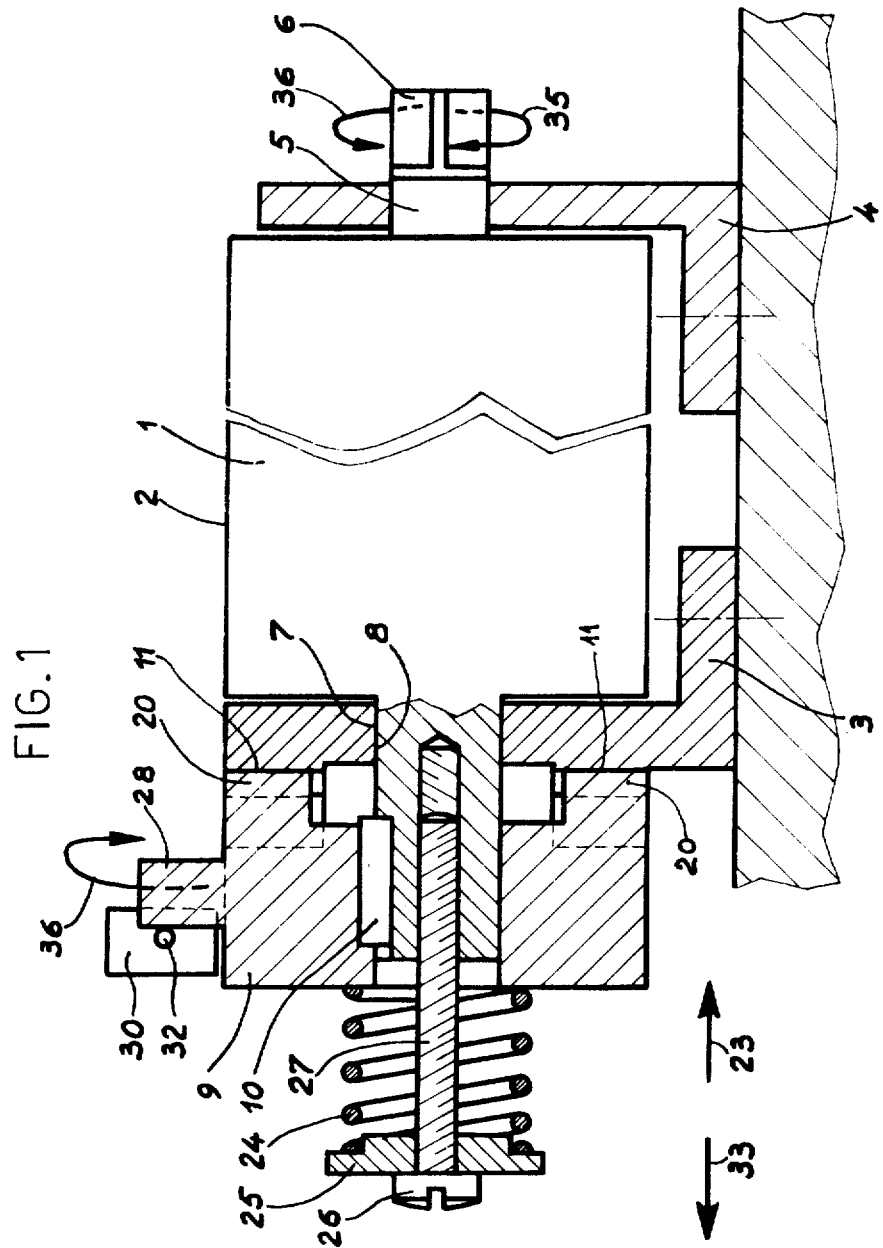
FIG. 1 is a cut-away side elevational view, partially in axial cross-section, of a first embodiment of the invention.

As shown in FIGS. 1 to 5, a reversible electric motor 1 has a casing 2 supported by two fixed brackets 3 and 4. Bracket 4 supports the motor shaft 5 which is provided with a square driving end 6 arranged to drive an external device, not shown. Bracket 3 has a cylindrical bearing recess 7 supporting a cylindrical part 8 solid with the casing 2 and coaxial with the motor shaft 6 so that casing 2 is turnably mounted in the bracket 3. A mobile element 9 is slidably mounted on the cylindrical part 8 with which it is keyed for rotation by a key 10 fixed on part 8. Bracket 3 includes two diametrically opposite hollow profiles 11 each having two ramps 14 and 15 disposed in a V-like configuration about a flat central part. These ramps 14 and 15 are extended by respective bearing surfaces 16 and 17 each terminated by a respective stop 18 and 19. Each of these hollow profiles 11 cooperates with a complementary part 20 in relief provided on the mobile element 9; each part 20 includes two ramps 21 and 22 disposed in a V-like configuration about a flat central end. The mobile element 9 is constantly biased in the direction of arrow 23 by one end of a compression spring 24 whose other end bears on a bearing washer 25 held in a given axial position by the head 26 of a screw 27 screwed in a threaded bore in part 8 of casing 2. The hollow profiles 11, the complementary parts 20, and the spring 24 form a torque limiter; the screw 27 enables initial setting of the minimum force which must to exerted on the spring 24 to move the mobile element 9 in direction 33.

The mobile element 9 has on its outer periphery an extension in the form of a protuberance 28 disposed between microcontacts 29 and 30 secured on the fixed support 3, and which are normally closed at rest (FIG. 3), these microcontacts each controlling stopping of the motor. Each microcontact 29, 30 is connected in series with one of the auxiliary windings of the motor 1 and they are also both connected to the current supply of the motor via inverter. Hence, according to whether the inverter is actuated in one direction or in the other, one or the other of the auxiliary motor windings is supplied and the motor turns in the corresponding direction. To stop the motor 1 during its rotation in either direction, it suffices to open microcontact 29 or microcontact 30. For this purpose, the microcontacts 29 and 30 each comprise a respective push-piece 31 and 32 disposed facing the protuberance 28.

Suppose for example that the shaft 5 turns in direction 35 (FIG. 1). As long as no abnormally great opposing torque is exerted on shaft 5, the motor 1 turns and the various elements occupy the position shown in FIGS. 1 to 3, in which the biasing spring 24 holds the profiled parts 20 of element 9 in the complementary hollow profiles 11 of bracket 3 and the protuberance 28 remains mid-way between the push-pieces 31 and 32.

Figure 4:
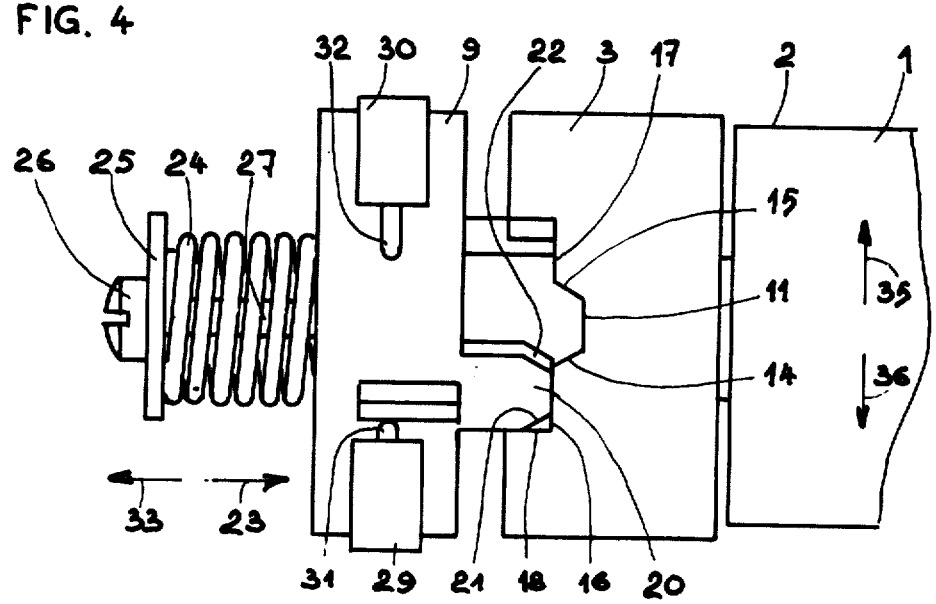
FIGS. 4 and 5 are views similar to FIGS. 2 and 3 respectively, showing the first embodiment in a position in which the motor is stopped.
Figure 5:
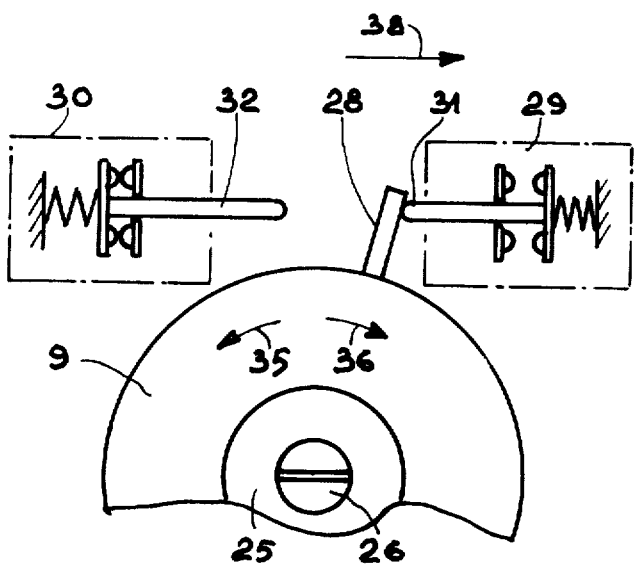

As soon as an opposing torque of a minimum predetermined value is exerted on the motor shaft 5 by the external driven device, the casing 2 moves angularly in the opposite direction to the shaft 5, i.e. in direction 36, driving with it the mobile element 9. The ramps 21 slide against ramps 14 of bracket 3, moving the mobile element 9 axially in direction 33 against the action of spring 24. After a given angular displacement, the flat end of the part 20 arrives on the bearing service 16 on which it slides until the flank of part 20 abuts against stop 18 as shown in FIG. 4. At the same time, the protuberance 28 has pushed the push-piece 31 in direction 38 (FIG. 5), and opened the microcontact 29 which causes stopping of the motor 1 so that shaft 5 ceases to turn in direction 35. The element 9 remains in this position so that the switch of microcontact 29 is held open. Thus, even if the opposing torque on the shaft 5 disappears, the shaft 5 can not start in direction 35. It can only start in the opposite direction, 36, when the other auxiliary winding of the motor is supplied via the microcontact 30 and the inverter.

Figure 2:
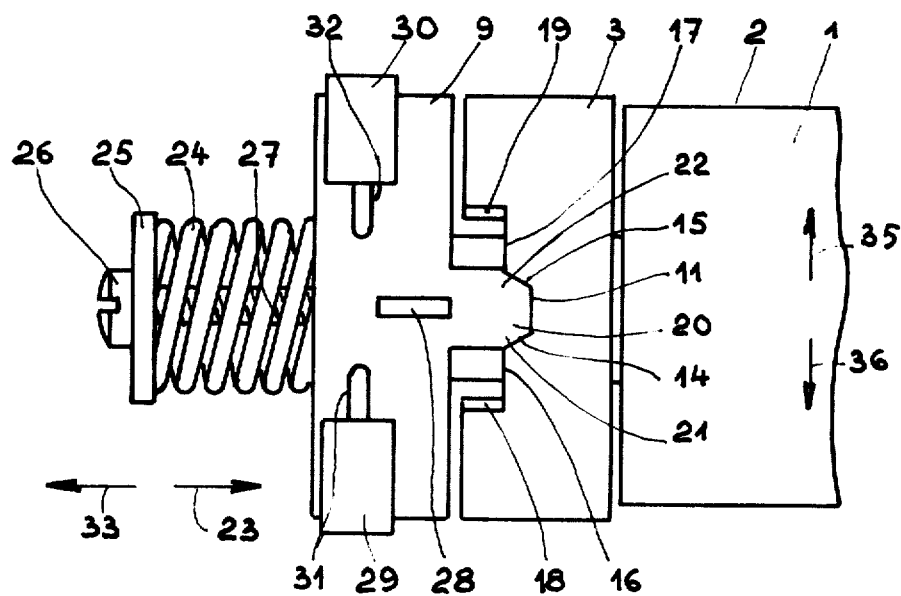
FIG. 2 is a top plan view of part of the embodiment of FIG. 1.
Figure 3:
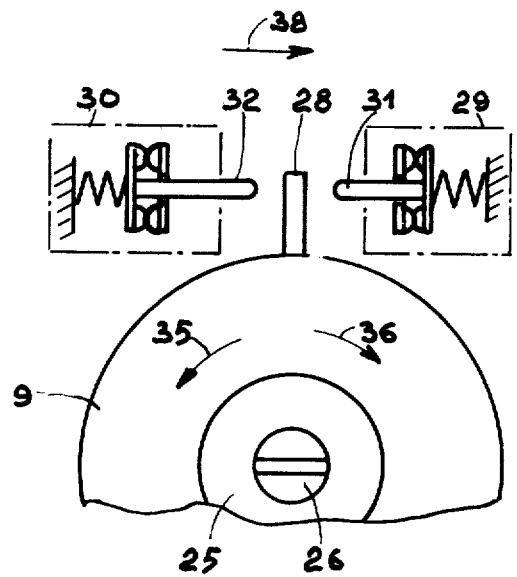
FIG. 3 is a partial and elevational view from the left of FIG. 1.

As soon as the motor shaft 5 turns in direction 36, the resistant torque on the shaft 5 is sufficient to turn the casing 2 and mobile element 9 in direction 35 until the mobile element 9 reassumes its position of FIG. 2 in which the parts 20 are once more lodged in the complementary hollow profiles 11, the protuberance 28 moving back to its median position (FIG. 3) between the two microcontacts. As soon as the opposing torque exerted on the motor shaft 5 exceeds the predetermined threshold value, the casing 2 and mobile element 9 turn in direction 35 and the protuberance 28 opens the contacts of microcontact 30, thus interrupting rotation of the shaft 5. Then, the motor can only be re-started in direction 35, and so on.

In the second embodiment shown in FIG. 6, the previous mobile element 9 in the form of a rotatable disc is replaced by a mobile element 40 which is slidably mounted radially in the motor casing 2, as indicated by arrows 42,43. Mobile element 40 has a part 20 profiled in relief similar to the previously described one. A corresponding hollow profile 11 is provided in the inner periphery 41 of the bearing surface of the bracket or fixed support 3. A protuberance 28 on element 40 is movable according to 42 or 43 in a recess 44 of casing 2, so that it can come to occupy a position between two microcontacts 29,30. All of the other elements are identical or equivalent to those of the previously described first embodiment. Rotation of the casing 2, for example in direction 36, moves the mobile element 40 in direction 43 against the action of biasing spring 24, so that protuberance 28 opens the contacts of microcontact 29, and stops the motor.

In the third embodiment (FIG. 7), the part 20 profiled in relief is provided on the periphery 41 of the fixed support 3, and the hollow profile 11 is provided in the end of mobile element 40. Moreover, the protuberance 28 is fixed with the casing 2. All the other elements are identical to those of the previously described second embodiment and operation is similar.

FIG. 8 shows a fourth embodiment in which a mobile element 50 is slidably mounted radially in the fixed support 3. At its end opposite spring 24, element 50 has both the part 20 profiled in relief and the protuberance 28. The corresponding hollow profile 11 is provided on the outer periphery 51 of the casing 2 which also supports the microcontacts 29 and 30 which are fixed therewith. All of the other elements are identical to those of the previously described first embodiment and operation is similar. For example, rotation of the casing 2 in direction 36 produces withdrawal of the mobile element 50 in direction 42, the protuberance 28 actuates microcontact 30, and rotation of the shaft 5 is interrupted.

The stop device according to the invention may be used in applications requiring interruption of rotation of the motor with precision when the motor has finished driving an external device. A particularly interesting application is rolling blinds.

What is claimed is:

1. In a motor having a casing cooperating with elastic biasing means tending to angularly fix the casing in relation to a fixed support, a torque-limiting stop device actuable by a given rotation of the motor casing to control stopping of the motor when an opposing torque on a driving shaft of the motor exceeds a predetermined value, comprising two cooperating profiles, one in relief the other hollow, one fixed for rotation with the motor casing and the other fixed angularly with the fixed support, one of the cooperating profiles being provided on a mobile element movable by coaction of the cooperating profiles against the action of the biasing means in a direction secant to the direction of relative movement of the two profiles produced by said rotation of the motor casing, at least one of the cooperating profiles having at least one ramp, each hollow profile being extended by at least one bearing surface at least approximately perpendicular to the direction of movement of said mobile element.

2. A device according to claim 1, in which said mobile element including one of said profiles is slidably mounted in one of the motor casing and the fixed support at least approximately radially to these two elements, the other profile being provided in a peripheral part of a respective one of the fixed support and the motor casing.

3. A device according to claim 1, in which said mobile element is solid for rotation with the motor casing and is slidably mounted axially thereof, the profile of said mobile element being disposed at an end of the mobile element facing the cooperating profile on the fixed support.

4. A device according to claim 1, in which the motor is reversible, said device comprising first and second means for stopping the motor driving said shaft respectively in first and second directions, each hollow profile being extended by bearing surfaces disposed on opposite sides of the hollow profile, each corresponding profile in relief bearing after said given rotation of the motor casing on a respective one of said bearing surfaces depending on the direction of rotation of the motor shaft.

5. In a reversible electric motor comprising a casing mounted rotatably on a fixed support coaxially with a driving shaft of the motor and rotatable in either direction from an angular rest position against the action of biasing means, a torque-limiting stop device actuable in response to rotation of the casing from said rest position when an opposing torque on the motor shaft exceeds a predetermined value, comprising cooperating complementary profiles in hollow and in relief one of which is angularly fixed relative to the motor casing and the other angularly fixed relative to the fixed support and one of which is on a mobile element movable by coaction of the cooperating profiles against the action of said biasing means in a direction substantially perpendicular to the direction of relative movement of said profiles produced by said rotation of the motor casing from its rest position, said hollow profile being extended on either side by a bearing surface substantially perpendicular to said direction of movement of said mobile element and a stop limiting the relative angular displacement of the motor casing from said rest position, each said profile in relief being able to rest on a corresponding bearing surface of a hollow profile to cancel the action of said biasing means tending to return said casing to its rest position, first and second means for stopping the motor driving said shaft in respective opposite directions, and at least one actuator fixed angularly with said casing for selectively actuating one of said first and second stop means to interrupt drive of said shaft in a respective direction when each profile in relief is on a respective one of said bearing surfaces and prevent restarting of the motor shaft in the same direction of rotation as before.

* * * * *